Figure 1:
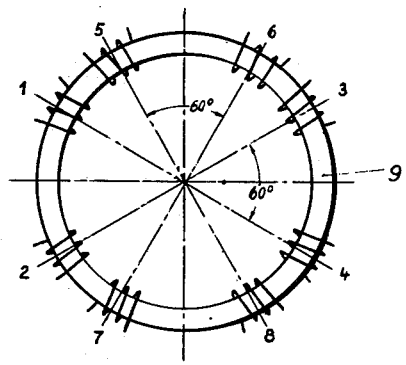

May 27, 1952      W. REINHARD      2,598,303

DEFLECTION COIL ARRANGEMENT IN CATHODE-RAY TUBES

Filed Nov. 15, 1951

INVENTOR
W. REINHARD

BY *R P Morris*

ATTORNEY

Patented May 27, 1952

2,598,303

UNITED STATES PATENT OFFICE 2,598,303

DEFLECTION-COIL ARRANGEMENT IN CATHODE-RAY TUBES

Wolfgang Reinhard, Pforzheim, Germany, assignor to International Standard Electric Corporation, New York, N. Y., a corporation of Delaware Application November 15, 1951, Serial No. 256,455
In Germany November 17, 1949

1 Claim. (Cl. 315—27)

This invention relates to an arrangement of the deflection coils of cathode ray tubes.

To generate the deflecting fields for the horizontal and vertical sweep of the cathode ray of television tubes, an arrangement is known consisting of a cylindrical ring structure of laminated iron, powdered iron, or sintered iron which is circumscribed by eight coils forming the two windings. These coils are combined in pairs of two at angles of about 60°, and they are connected in series magnetically. These pairs in turn connect magnetically opposing by two and two to provide the separate deflection windings. Thus it is achieved that the magnetic lines traverse the air space, so in the interior of the ring are set up two fields in space quadrature.

The wave controlling the horizontal sweep contains high harmonics which fall into the range of the natural frequencies of the deflection coils. This is of no consequence as long as the natural frequencies of all coils controlling the horizontal sweep are accurately identical since the natural oscillation of the resonant circuit to which the inductance of the deflection coils and their residual capacitance combine is utilized in the conventional circuits for generating the deflecting current wave. But if the partial coils because of capacitative unbalance, differ in their natural frequencies, partial oscillations are set up which are apparent in the pattern formed on the screen as wavy deviations from the desired straight lines. With deflection coils combined from two partial coils it is known to provide capacitive balance by a trimmer condenser across one partial coil. It is also known to connect coils forming the deflection winding for one direction so that they form electrically a two-coil arrangement by pairs with the two pairs of coils connected electrically in series. Such an arrangement, however, permits a disturbing phenomenon. The coils are also traversed by the vertical deflection field, because there is not a right angle relation between the horizontal and vertical coils. As the coils are connected in magnetically opposing pairs, these fields will cause no distortion in the coils while they are exactly alike. Small unbalance, however, results in a circulating current in the horizontal sweep coil pairs which may deform the vertical deflecting field to a degree that the spot is heavily distorted.

This invention avoids the occurrence of a circulating current for the vertical deflecting frequency by connecting a capacitance which readily passes the horizontal sweep frequency, but presents a high impedance to the vertical deflecting signal lead between the coils.

As an example the accompanying drawing shows schematically two different known designs and an application of this invention.

Figure 2:
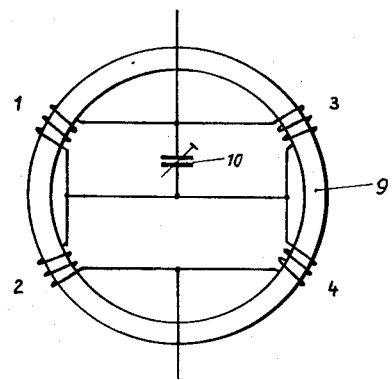
Figure 3:
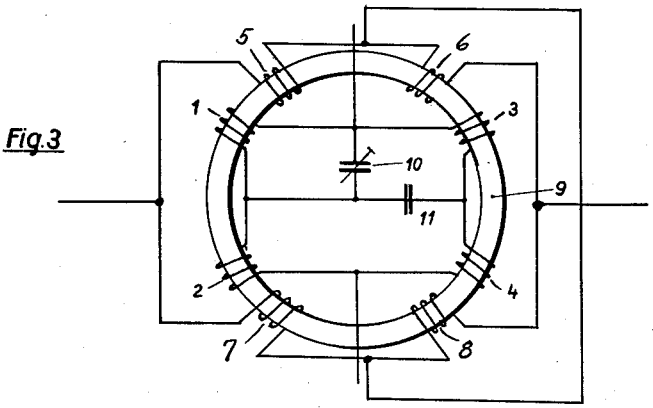

In this drawing, Fig. 1 shows a known design of a cylindrical ring yoke carrying eight coils while Fig. 2 presents a known circuit with four coils in a deflecting winding with the coils connected by electrically parallel pairs, and both pairs connected in series, and Fig. 3 finally shows an application of the present invention.

In the drawing the numerals 1 through 8 refer to coils wound on the iron yoke 9, while 10 and 11 refer to capacitors.

With the known arrangement of Fig. 1, the coils displaced by 60 angular degrees which are connected in pairs, are connected magnetically opposing so that the magnetic lines travel through the air space. The two fields produced by coils 1, 2, 3, 4 and 5, 6, 7, 8 respectively are in space quadrature in the interior of the ring.

In Fig. 2, the coils 1 and 3, and 2 and 4 are shown connected electrically in parallel. Parallel to coil pair 1 and 3 is connected the trimmer capacitor 10. The coils 1—3 and 2—4 are traversed herewith by the vertical deflection field which is generated in the coils 5 through 8, not shown in this figure for the sake of simplicity. As the coils 1—3 and 2—4 are connected magnetically opposing, these fields produce disturbing effects only when they are unequal. Equality is difficult to preserve, however, so it is desirable to overcome this difficulty as far as possible.

In Fig. 3 a capacitance 11 is inserted in the common lead between the coils 1—3 and 2—4. Capacitance 11 is large enough to present little impedance to the higher horizontal sweep frequency, so that the circuit is substantially unaltered for this effect. The capacitance 11 is, however, small enough to present a high impedance to the lower vertical sweep frequency. Thus circulating vertical sweep frequency energy due to inequality of the coils is highly attenuated so that disturbances caused thereby are greatly reduced.

What is claimed is:

In a magnetic coil deflection system for cathode rays of the type using a toroidal core of divided magnetic material, and separate deflection windings each of which comprise four coils, the deflection windings being adapted to be energized by energies of different frequencies the coils of said windings being positioned at angles of less than 90° with respect to one another whereby mutual coupling occurs between said windings, the coils provided for energization by the higher of the frequencies being connected by pairs in parallel, the coils of said pairs being connected in series, and provided with a variable trimmer condenser across the coils forming one of said pairs, a system for reducing the effects of the lower frequency induced in the higher frequency winding comprising a capacitor offering negligible impedance to the higher frequency waves, and relatively high impedance to the lower frequency waves, serially positioned in the parallel connection between said pairs.

WOLFGANG REINHARD.

REFERENCES CITED

The following references are of record in the file of this patent:

UNITED STATES PATENTS

| Number | Name | Date |
|---|---|---|
| 2,227,053 | Andrieu et al. | Dec. 31, 1940 |
| 2,228,821 | Hansen | Jan. 14, 1941 |
| 2,302,161 | Woerner | Nov. 17, 1942 |
| 2,428,947 | Torsch | Oct. 14, 1947 |
| 2,437,513 | Gethmann | Mar. 9, 1948 |
| 2,443,032 | Gethmann | June 8, 1948 |
| 2,545,346 | Edelsohn | Mar. 11, 1951 |